US011069900B2

(12) United States Patent
Jin et al.

(10) Patent No.: US 11,069,900 B2
(45) Date of Patent: Jul. 20, 2021

(54) POSITIVE ELECTRODE FOR LITHIUM AIR BATTERIES, METHOD OF MANUFACTURING THE POSITIVE ELECTRODE, AND LITHIUM AIR BATTERY INCLUDING THE POSITIVE ELECTRODE

(71) Applicants: Hyundai Motor Company, Seoul (KR); KIA Motors Corporation, Seoul (KR)

(72) Inventors: Dae Gun Jin, Suwon-si (KR); Eun Ji Kwon, Hwaseong-si (KR); Jee Youn Hwang, Seoul (KR); Ji Hoon Jang, Suwon-si (KR); Gwang Seok Oh, Seoul (KR); Won Keun Kim, Seoul (KR); Samuel Seo, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 61 days.

(21) Appl. No.: 16/433,519

(22) Filed: Jun. 6, 2019

(65) Prior Publication Data

US 2020/0144629 A1     May 7, 2020

(30) Foreign Application Priority Data

Nov. 2, 2018    (KR) ........................ 10-2018-0133248

(51) Int. Cl.
    *H01M 4/88*        (2006.01)
    *H01M 4/96*        (2006.01)
    (Continued)

(52) U.S. Cl.
    CPC ....... *H01M 4/8896* (2013.01); *H01M 4/8668* (2013.01); *H01M 4/8882* (2013.01);
    (Continued)

(58) Field of Classification Search
    CPC ......... H01M 12/08; H01M 2004/8689; H01M 4/8668; H01M 4/8814; H01M 4/8882; H01M 4/8896; H01M 4/96
    See application file for complete search history.

(56) References Cited

U.S. PATENT DOCUMENTS

| | | | |
|---|---|---|---|
| 2014/0272597 A1* | 9/2014 | Mikhaylik | .............. H01M 4/13 |
| | | | 429/233 |
| 2015/0044575 A1* | 2/2015 | Kawaji | ............... H01M 10/052 |
| | | | 429/320 |
| 2018/0006307 A1* | 1/2018 | Song | ................... H01M 10/052 |

FOREIGN PATENT DOCUMENTS

KR     10-2016-0045425 A     4/2016

OTHER PUBLICATIONS

E. Nasybulin, W. Xua, M. H. Engelhard, Z. Nie, X. S. Li, J.-G. Zhang. Stability of polymer binders in Li-O2 batteries, Journal of Power Sources 243 (2013) 899-907.*

* cited by examiner

*Primary Examiner* — Carlos Barcena
(74) *Attorney, Agent, or Firm* — Brinks Gilson & Lione

(57) ABSTRACT

The present disclosure relates to a positive electrode for lithium air batteries, a method of manufacturing the positive electrode, and a lithium air battery including the positive electrode, and more particularly to a positive electrode for lithium air batteries, wherein the positive electrode is manufactured through a dry process instead of a conventional wet process and a mixture of a positive electrode active material and a binder is ball-milled under specific conditions, thereby reducing or preventing a swelling phenomenon due to a solvent and increasing the force of coupling between the positive electrode active material and the binder, whereby it is possible to manufacture a high-density electrode and to improve the durability of the electrode, and wherein the (Continued)

lifespan of a lithium air battery is increased when the positive electrode is applied to the battery.

14 Claims, 4 Drawing Sheets

(51) Int. Cl.
    *H01M 4/86*     (2006.01)
    *H01M 12/08*     (2006.01)

(52) U.S. Cl.
    CPC ............. *H01M 4/96* (2013.01); *H01M 12/08* (2013.01); *H01M 2004/8689* (2013.01)

[FIG.1]
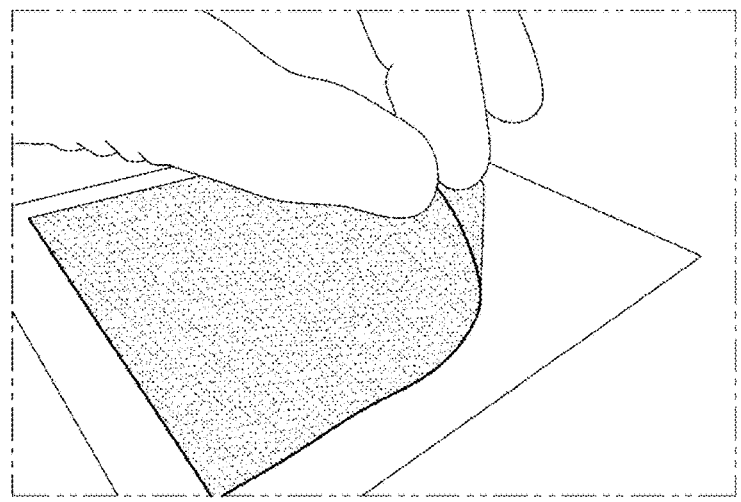
[FIG.2]
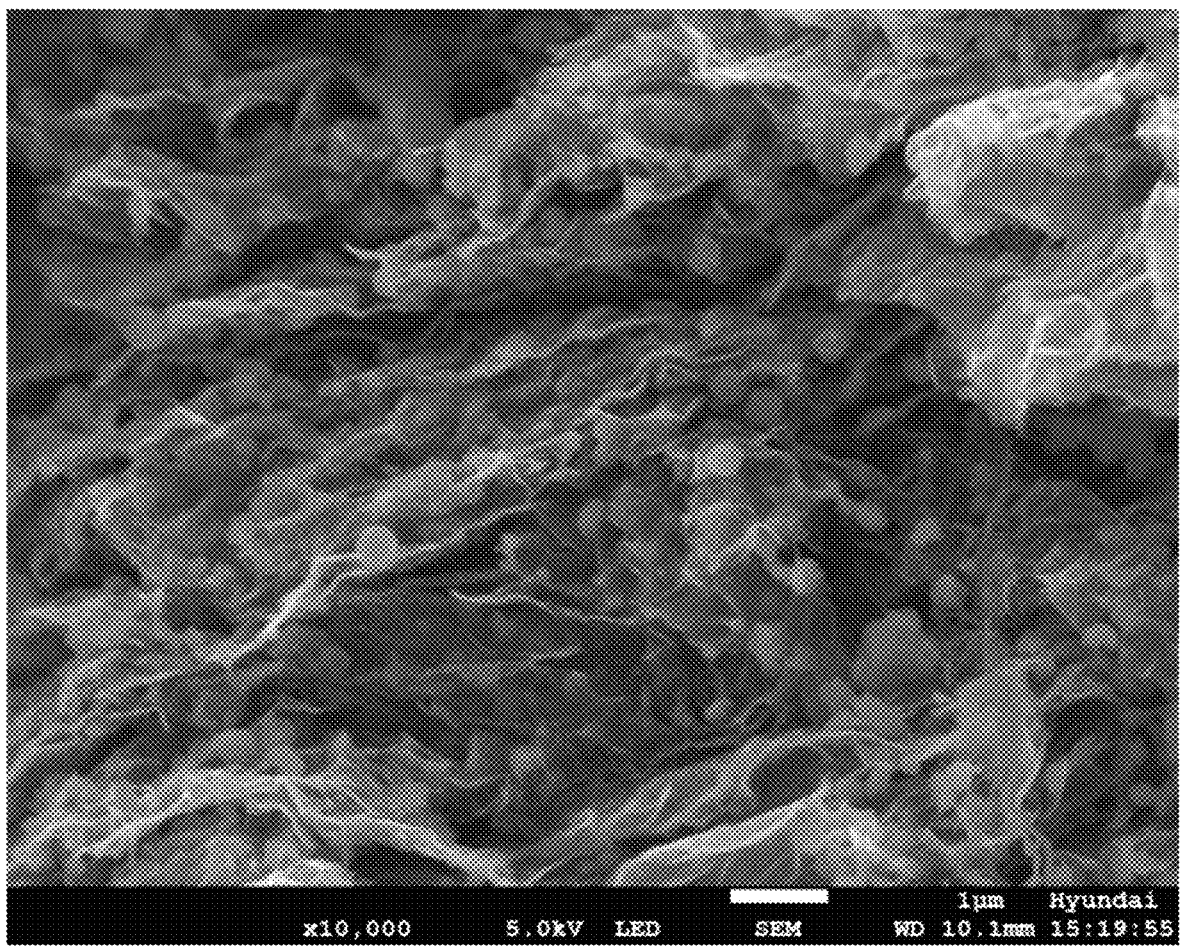

[FIG.3]
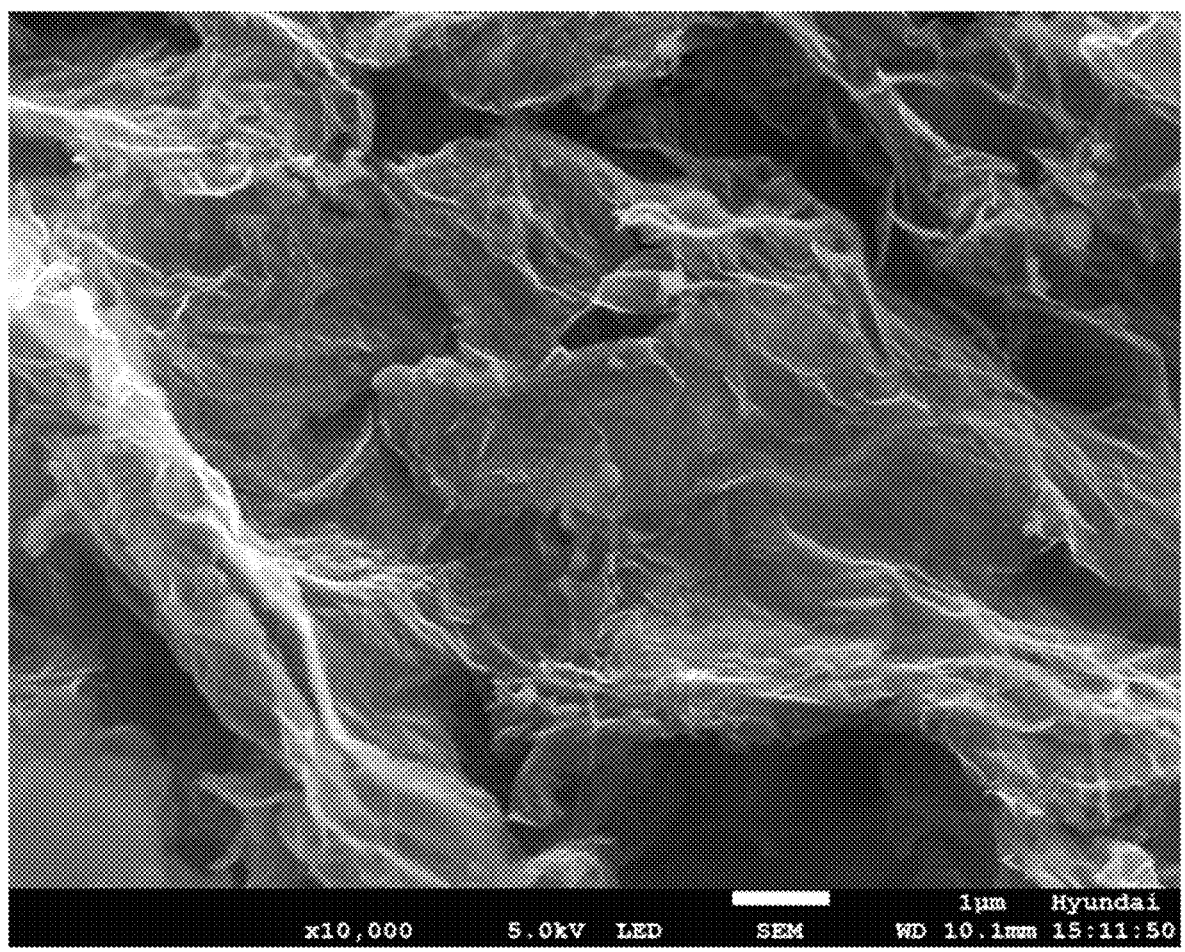

[FIG.4]
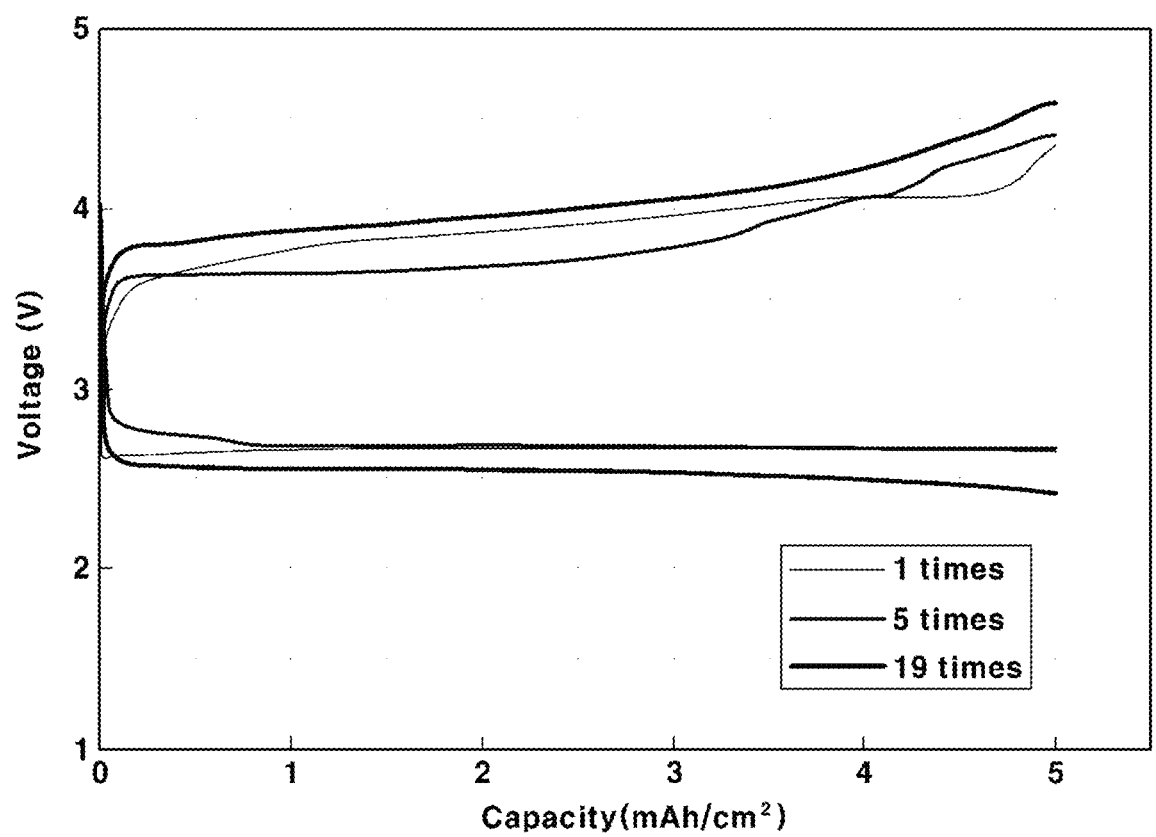

[FIG.5]
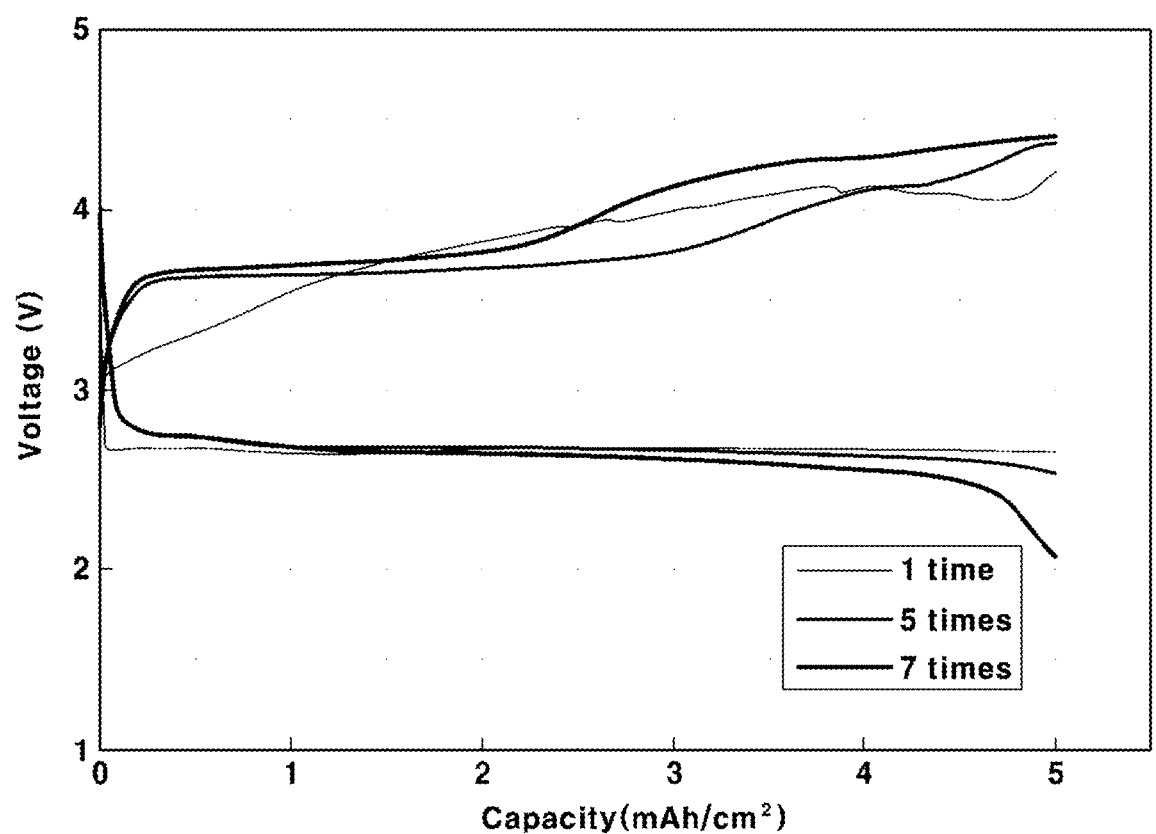

POSITIVE ELECTRODE FOR LITHIUM AIR BATTERIES, METHOD OF MANUFACTURING THE POSITIVE ELECTRODE, AND LITHIUM AIR BATTERY INCLUDING THE POSITIVE ELECTRODE

CROSS-REFERENCE TO RELATED APPLICATION

This application claims priority to and the benefit of Korean Patent Application No. 10-2018-0133248, filed on Nov. 2, 2018, the entire contents of which is incorporated herein by reference.

FIELD

The present disclosure relates to a positive electrode for lithium air batteries, which is manufactured through a dry process using no solvent instead of a conventional wet process.

BACKGROUND

The statements in this section merely provide background information related to the present disclosure and may not constitute prior art.

An electrode of a conventional lithium secondary battery is manufactured by coating a slurry, including an active material, a conductive agent, a binder, and a solvent, on metal foil, which serves as a current collector, and drying the solvent. In addition, an electrode of a lithium sulfur battery, a lithium air battery, or an all-solid battery, on which research has been conducted as a next-generation battery, is also manufactured using the above general method.

Particularly, in the case of the lithium air battery, which is one of the next-generation batteries, a carbon material is mainly used as a positive electrode active material. As a result, a positive electrode is generally manufactured using a carbon material and a binder. In addition, the positive electrode of the lithium air battery may utilize a movement path of oxygen. For this reason, metal foil, which is used for a conventional electrode, is not used as a current collector, but an electrode is manufactured using metal foam or mesh as a current collector.

However, in the conventional method of manufacturing the lithium air battery, a lithium ion battery and the lithium air battery differ from each other in terms of the kind of current collector. In the case of the lithium air battery, as previously described, a foam- or mesh-type current collector having therein pores, through which oxygen gas flows to the positive electrode, is used as the positive electrode current collector, which is an open system. When a slurry is coated on the foam- or mesh-type current collector, as in the conventional art, we have discovered that electrode materials may not be uniformly fixed to the current collector, unlike a metal foil current collector having a uniform surface. Therefore, an increase in the amount of binder may be employed.

Second, we have discovered that the viscosity of the slurry impacts the conventional slurry coating method. Consequently, it may be desirable to adjust the viscosity of the slurry depending on the material and composition of the active material, the conductive agent, and the binder. Also, in the case in which an active material or a conductive agent that is reactive to the solvent is used, it may be desirable to also change the solvent and the binder.

The above information disclosed in this Background section is provided only for enhancement of understanding of the background of the disclosure and therefore it may contain information that does not form the prior art that is already known to a person of ordinary skill in the art.

SUMMARY

The present disclosure, in one aspect, provides a method of manufacturing a positive electrode for lithium air batteries, wherein the positive electrode is manufactured through a dry process instead of a conventional wet process, a mixture of a positive electrode active material and a binder is ball-milled under specific conditions, thereby inhibiting a swelling phenomenon caused by a solvent and increasing the force of coupling between the positive electrode active material and the binder.

The present disclosure provides a positive electrode for lithium air batteries, wherein a binder having high force of coupling with a positive electrode active material is selectively used to manufacture a high-density electrode and to improve the durability of the electrode.

The present disclosure describes a lithium air battery including the positive electrode, wherein the lithium air battery does not include a positive electrode current collector.

The present disclosure is not limited to the above, and will be clearly understood from the following description.

In one aspect, the present disclosure provides a method of manufacturing a positive electrode for lithium air batteries, the method including ball-milling a mixture of 70 to 99 wt % of a positive electrode active material and 1 to 30 wt % of a binder to manufacture an electrode mixture, and applying the electrode mixture to release paper and rolling the electrode mixture to manufacture an electrode.

At the step of manufacturing the electrode mixture, the ball-milling may be performed using a planetary mill.

At the step of manufacturing the electrode mixture, the ball-milling may be performed in the state in which the mixture and a ball are put in a reaction vessel.

The mixing ratio of the mixture to the ball put into the reaction vessel may be 1:150 to 1:350 in a weight ratio.

The ball may include a first ball and a second ball, and the diametric ratio of the first ball to the second ball may be 1 to 5:1.

The weight ratio of the first ball to the second ball may be 1:1 to 3.5.

The ball may be made of one selected from among zirconia, tool steel, stainless steel, and cemented carbide.

The step of manufacturing the electrode mixture may be performed for 5 to 8 cycles under conditions of a rotation speed of 50 to 200 rpm and a time of 5 to 15 minutes.

The positive electrode active material may be at least one selected from the group consisting of carbon black, carbon nanotubes (CNT), graphene, and reduced graphene oxide (rGO).

The binder may be polytetrafluoroethylene (PTFE).

The density of the positive electrode to the positive electrode active material may be 100 to 500 mg/cc.

The positive electrode may have a porous structure having a pore size of 10 nm to 100 μm.

The positive electrode may have a thickness of 10 to 200 μm.

The method may further include heat-treating the rolled and manufactured electrode after the step of manufacturing the electrode.

At the step of heat-treating the electrode, the heat-treating may be performed at a temperature of 150 to 300° C. for 10 minutes to 2 hours.

In another aspect, the present disclosure provides a positive electrode for lithium air batteries, wherein the positive electrode includes 70 to 99 wt % of a positive electrode active material and 1 to 30 wt % of a binder, and the density of the positive electrode to the positive electrode active material is 100 to 500 mg/cc.

The positive electrode may have a porous structure having a pore size of 10 nm to 100 μm.

The positive electrode may have a thickness of 10 to 200 μm.

In a further aspect, the present disclosure provides a lithium air battery including the positive electrode, a negative electrode, a separator formed between the positive electrode and the negative electrode, and a negative electrode current collector formed on the negative electrode.

Other aspects of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a photograph showing a positive electrode for lithium air batteries manufactured according to Example;

FIG. 2 is an SEM micrograph showing the positive electrode for lithium air batteries manufactured according to Example in a discharged state;

FIG. 3 is an SEM micrograph showing the positive electrode for lithium air batteries manufactured according to Example in a charged state;

FIG. 4 is a graph showing charging and discharging of a lithium air battery manufactured according to Example; and FIG. 5 is a graph showing charging and discharging of a lithium air battery manufactured according to Comparative Example.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The principles of the present disclosure will be clearly understood from the following description with reference to the annexed drawings. However, the present disclosure is not limited, and may take on a variety of different forms. The examples herein are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

Hereinafter, the present disclosure will be described in detail.

Conventionally, an electrode slurry including a solvent is manufactured, and the electrode slurry is coated on a current collector and is then dried to manufacture an electrode for lithium air batteries. In such a conventional wet process, the wettability and reactivity of the solvent are changed depending on the material for an active material and a binder. Consequently, it is possible to appropriately combine the active material and the binder and to adjust the viscosity of the slurry. As a result, the process is complicated and long.

In the present disclosure, a positive electrode is manufactured using a dry process, instead of using the conventional wet process, and a mixture of a positive electrode active material and a binder is ball-milled under specific conditions, thereby inhibiting a swelling phenomenon due to a solvent and increasing the force of coupling between the positive electrode active material and the binder. In addition, a binder having high force of coupling with the positive electrode active material is selectively used to manufacture a high-density electrode and to improve the durability of the electrode. In addition, no positive electrode current collector is included when the electrode is applied to a lithium air battery. Consequently, it is possible to reduce the weight of the battery and to increase the lifespan of the battery through an increase in the energy density thereof.

The present disclosure relates to a positive electrode for lithium air batteries, a method of manufacturing the positive electrode, and a lithium air battery including the positive electrode. The method of manufacturing the positive electrode includes a step of manufacturing an electrode mixture (S1) and a step of manufacturing an electrode (S2).

More specifically, the method of manufacturing the positive electrode may include a step of ball-milling a mixture of 70 to 99 wt % of a positive electrode active material and 1 to 30 wt % of a binder to manufacture an electrode mixture and a step of applying the electrode mixture to release paper and rolling the electrode mixture to manufacture an electrode.

(1) Step of Manufacturing Electrode Mixture (S1)

The step of manufacturing the electrode mixture (S1) may be a step of ball-milling a mixture of 70 to 99 wt % of a positive electrode active material and 1 to 30 wt % of a binder to manufacture an electrode mixture.

The positive electrode active material may be at least one selected from the group consisting of carbon black, carbon nanotubes (CNT), graphene, and reduced graphene oxide (rGO). However, the present disclosure is not limited thereto. In a conventional wet process, carbon nanotubes are mixed with a dispersant because the carbon nanotubes are not sufficiently dispersed in an inorganic solvent. In this case, however, the dispersant acts as an impurity in an electrode, thereby reducing the durability and energy density of the electrode. In the present disclosure, however, the positive electrode active material and the binder are mixed through a dry process, whereby various kinds of materials may be mixed and used without limitation.

In the conventional wet process, a polyvinylidene fluoride (PVdF)-based binder is mainly used as the binder. However, the PVdF binder is dissolved by oxygen radicals, whereby the durability of the electrode is reduced. In the present disclosure, a binder having high force of coupling with the positive electrode active material may be selectively used. Specifically, the binder may be polytetrafluoroethylene (PTFE). However, the present disclosure is not limited thereto. The PTFE binder exhibits high flexibility. In the case in which the PTFE binder is used, therefore, it is possible to manufacture a flexible electrode.

The mixture may include 70 to 99 wt % of a positive electrode active material and 1 to 30 wt % of a binder. If the content of the binder is less than 1 wt %, the coupling force between the positive electrode active materials may be reduced. If the content of the binder is greater than 30 wt %, the content of the binder is relatively high, whereby the electrical conductivity of the electrode may be reduced and the performance of the electrode may be reduced. In one form, the mixture includes 70 to 95 wt % of a positive electrode active material and 5 to 30 wt % of a binder. In one form, the mixture includes 70 to 90 wt % of a positive electrode active material and 10 to 30 wt % of a binder.

At the step of manufacturing the electrode mixture, the ball-milling may be performed using a planetary mill. The ball-milling may be performed in the state in which the mixture and a ball are put in a reaction vessel. In a general ball mill, the ball simply strikes the wall to apply impacts to the material. In a planetary mill, however, the ball rotates, and a reaction vessel in the planetary mill revolves to thus induce shear stress. In this case, the mixture put into the planetary mill may be settled by physical coupling due to the induced shear stress. The amount of the mixture and the ball that are put therein may be changed depending on the volume of the reaction vessel in the planetary mill. In one form, in the case in which the volume of the reaction vessel is 70 to 90 ml, 55 to 75 wt % of the mixture and the ball may be put therein. However, the present disclosure is not limited thereto.

In addition, the mixing ratio of the mixture to the ball put into the reaction vessel may be 1:150 to 1:350 in a weight ratio. If the mixing ratio of the mixture to the ball put into the reaction vessel is 1: less than 150 in a weight ratio, sufficient shear stress for the process may not be applied to the material, and as a result, the active material and the binder may not be appropriately coupled to each other. If the mixing ratio of the mixture to the ball put into the reaction vessel is 1: greater than 350 in a weight ratio, the content of the ball is increased. Consequently, when excessive force is applied, the electrode may be pulverized without being formed. In one aspect, the mixing ratio of the mixture to the ball put into the reaction vessel is 1:200 to 250 in a weight ratio. In one form, the mixing ratio of the mixture to the ball put into the reaction vessel is 1:210 to 230 in a weight ratio.

The ball may include two balls having different diameters, which are put in the reaction vessel. However, the present disclosure is not limited thereto. That is, the ball may further include a third ball and/or a fourth ball depending on the size of the reaction vessel. Specifically, the ball may include a first ball and a second ball, and the diametric ratio of the first ball to the second ball may be 1 to 5:1. If the diametric ratio of the first ball to the second ball deviates from the above range, shear stress may not be uniformly formed. As a result, force is locally applied in the vessel, whereby no electrode may be formed. In addition, the weight ratio of the first ball to the second ball may be 1:1 to 3.5. The ball may be made of one selected from among zirconia, tool steel, stainless steel, and cemented carbide.

The sizes of the first ball and the second ball may be changed depending on the size of the reaction vessel. For example, in the case in which the volume of the reaction vessel is 70 to 90 ml, the ball may include a first ball having a diameter of 8 to 15 mm and a second ball having a diameter of 3 to 7 mm. In addition, a third ball having a diameter of 1 to 3 mm may be further included. However, the present disclosure is not limited thereto. Also, in the case in which the volume of the reaction vessel is 500 ml, the ball may include a first ball having a diameter of 25 to 35 mm and a second ball having a diameter of 15 to 25 mm. Also, in the case in which the volume of the reaction vessel is 500 L, the ball may include a first ball having a diameter of 25 to 35 mm, a second ball having a diameter of 15 to 25 mm, and a third ball having a diameter of 35 to 50 mm. Alternatively, in the case in which the volume of the reaction vessel is 500 L, the ball may include a first ball having a diameter of 25 to 35 mm, a second ball having a diameter of 15 to 25 mm, and a fourth ball having a diameter of 50 to 100 mm.

The step of manufacturing the electrode mixture may be performed for 5 to 8 cycles under conditions of a rotation speed of 50 to 200 rpm and a time of 5 to 15 minutes. If the rotation speed is less than 50 rpm, shear stress for coupling the binder with the positive electrode active material may not be realized. If the rotation speed is greater than 200 rpm, the material may turn into powder due to the pulverizing operation of the planetary mill, or the electrode mixture may be deformed due to heat generated by the strong force of the planetary mill. In one aspect, the rotation speed is 80 to 120 rpm.

When the ball-milling is performed at step (S1) in the state in which the above conditions are satisfied, shear stress is applied to the binder in the mixture, whereby the physical coupling between the binder and the positive electrode active material may be easily achieved. Also, in the dry process using the ball-milling, it is possible to adjust the density of the electrode to a desired level at the time of manufacturing the electrode. Furthermore, no solvent is included, and therefore various kinds of active materials may be mixed with the binder, whereby it is possible to easily manufacture the electrode.

(2) Step of Manufacturing Electrode (S2)

The step of manufacturing the electrode (S2) may be a step of applying the electrode mixture to release paper and rolling the electrode mixture to manufacture an electrode. At step (S2), the electrode mixture may be applied to the release paper, and the electrode mixture may be rolled by roll pressing. The manufactured electrode has a uniform thickness. Since the thickness and density of the electrode are adjustable, it is possible to manufacture an electrode having desired conditions.

After the step of manufacturing the electrode, a step of heat-treating the rolled and manufactured electrode may be further performed. At the step of heat-treating the electrode, the electrode manufactured at step (S2) may be heat-treated, thereby increasing the coupling force of the binder. At the step of heat-treating the electrode, the rolled electrode may be heat-treated at a temperature of 150 to 300° C. for 10 minutes to 2 hours. If the heat treatment temperature and time are not satisfied, the coupling force of the binder may be reduced, whereby the performance of the electrode may be reduced.

In the positive electrode manufactured through the above process, the density of the electrode to the positive electrode active material may be 100 to 500 mg/cc. If the density of the electrode is less than 100 mg/cc, the force of coupling between the positive electrode active material and the binder is low, whereby it is not possible to maintain the form of the electrode without using a positive electrode current collector. In addition, a swelling phenomenon may occur due to the solvent included at the time of manufacturing the lithium air battery. If the density of the electrode is greater than 500 mg/cc, few pores are formed in the electrode, whereby it is not possible to secure the movement path of oxygen. In this case, a site in which reaction products are generated does not exist, whereby the performance of the electrode may be reduced. In one aspect, the density of the electrode to the positive electrode active material is 200 to 400 mg/cc.

The positive electrode may have a density of 100 to 500 mg/cc to the positive electrode active material, whereby pores may be formed in the positive electrode. Specifically, the positive electrode may have a porous structure having a pore size of 10 nm to 100 μm.

The positive electrode may have a thickness of 10 to 200 μm. If the thickness of the positive electrode is less than 10 μm, the density of the electrode is low, and the force of coupling between the positive electrode active material and the binder is low, whereby it is not possible to maintain the form of the electrode. If the thickness of the positive electrode is greater than 200 μm, the movement path of oxygen is too long, whereby the performance of the electrode may be reduced.

In addition, the present disclosure provides a positive electrode for lithium air batteries, wherein the positive electrode includes 70 to 99 wt % of a positive electrode active material and 1 to 30 wt % of a binder and wherein the density of the positive electrode to the positive electrode active material is 100 to 500 mg/cc.

The positive electrode may have a porous structure having a pore size of 10 nm to 100 μm. The positive electrode may have a thickness of 10 to 200 μm.

In addition, the present disclosure provides a lithium air battery including the positive electrode, a negative electrode, a separator formed between the positive electrode and the negative electrode, and a negative electrode current collector formed on the negative electrode.

The lithium air battery may include no positive electrode current collector. That is, the positive electrode of the lithium air battery has a porous structure, whereby the positive electrode serves as the movement path of oxygen and provides a positive electrode active material without using an additional positive electrode current collector. Since no positive electrode current collector is included, the weight of the lithium air battery may be reduced, whereby the energy density of the lithium air battery may be increased.

Hereinafter, the present disclosure will be described in more detail with reference to an example. However, the present disclosure is not limited by the following example.

Example

Polytetrafluoroethylene (PTFE) was prepared as a binder. A planetary mill including a reaction vessel having a volume of 90 ml was prepared. Zirconium balls were used as balls. A first ball having a diameter of 11 mm and a second ball having a diameter of 5.2 mm were prepared.

Subsequently, 90 wt % of a positive electrode active material and 10 wt % of a binder were put into the reaction vessel having a volume of 80 ml, and the first ball and the second ball were also input into the reaction vessel in a weight ratio of 1:1.2. That is, the mixing ratio of the mixture to the ball was 1:217 in a weight ratio. Subsequently, ball-milling was performed once at a rotation speed of 100 rpm for 10 minutes. After a five-minute pause, ball-milling was performed again under the same conditions. The above process was repeated five times to manufacture an electrode mixture.

Subsequently, the electrode mixture was applied between glassine paper sheets and was rolled by roll pressing to manufacture an electrode. The manufactured positive electrode had a pore size of 10 nm to 100 μm. In addition, the density of the positive electrode to the positive electrode active material was 300 mg/cc, and the thickness of the electrode was 100 μm.

A separator, a negative electrode, and a negative electrode current collector were sequentially stacked on the manufactured positive electrode using a general method in order to manufacture a lithium air battery. At this time, a polyethylene (PE) separator, which was used in a general lithium ion battery, was used as the separator, and lithium metal foil was used as the negative electrode. In addition, copper foil was used as the negative electrode current collector.

Comparative Example 90 wt % of carbon black, as a positive electrode active material, and 10 wt % of PVdF, as a binder, were mixed with N-methyl-2-pyrrolidone, as an organic solvent, to manufacture a positive electrode slurry. Subsequently, the positive electrode slurry was coated on nickel (Ni) foam, as a positive electrode current collector, using a doctor blade so as to have a thickness of 100 μm, and was dried at a temperature of 80° C. for 1 hour to form a positive electrode layer. Subsequently, a separator, a negative electrode, and a negative electrode current collector were sequentially stacked on the positive electrode layer in the same manner as in Example to manufacture a lithium air battery.

Experimental Example

In order to determine the lifespan characteristics of the lithium air batteries manufactured according to Example and Comparative Example, the lithium air batteries were charged and discharged using a general method under conditions of a constant current (CC) of 0.1 C-rate and a voltage of 2 V to 4.5 V. The results are shown in FIGS. 1 to 5.

FIG. 1 is a photograph showing the positive electrode for lithium air batteries manufactured according to Example. It can be seen from FIG. 1 that the positive electrode included the PTFE binder, whereby a flexible electrode was manufactured.

FIG. 2 is an SEM micrograph showing the positive electrode for lithium air batteries manufactured according to Example in a discharged state. FIG. 3 is an SEM micrograph showing the positive electrode for lithium air batteries manufactured according to Example in a charged state. Referring to FIGS. 2 and 3, the lithium air battery was charged and discharged once, and was then disassembled to measure the surface of the positive electrode using a scanning electron microscope (SEM). FIGS. 2 and 3 show micro-scale pores formed in the surface of the positive electrode. In addition, discharge products were formed on the positive electrode in the discharged state of FIG. 2, and the discharge products disappeared from the positive electrode in the charged state of FIG. 3. As a result, it can be seen that, even though the lithium air battery was repeatedly charged and discharged, the change in the total volume of the positive electrode was slight while coupling between the positive electrode active material and the binder in the positive electrode was maintained.

FIG. 4 is a graph showing charging and discharging of the lithium air battery manufactured according to Example. FIG. 5 is a graph showing charging and discharging of the lithium air battery manufactured according to Comparative Example. It can be seen from FIGS. 4 and 5 that, in the case of Comparative Example, in which the positive electrode was manufactured through a wet process, the lifespan of the battery was terminated after the battery was charged and discharged about 7 times and that, in the case of Example, in which the positive electrode was manufactured through a dry process, the lifespan of the battery was terminated after the battery was charged and discharged about 19 times. Consequently, it can be seen that the lifespan of the battery according to Example was about 2.7 times as long as that of the battery according to Comparative Example.

Also, in the case of Example, in which no positive electrode current collector was included, the thickness and volume of the positive electrode were relatively small. When a pack battery is manufactured using the positive electrode, therefore, it is possible to increase the energy density of the battery while reducing the weight of the battery.

As apparent from the foregoing, a positive electrode for lithium air batteries according to the present disclosure is manufactured through a dry process, in which no solvent is used, instead of a conventional wet process, whereby it may be possible to reduce or prevent a swelling phenomenon due to the solvent and to easily manufacture the positive electrode at reduced cost.

In addition, a binder having high force of coupling with a positive electrode active material is selectively used. Consequently, it is possible to manufacture a high-density electrode and to improve the durability of the electrode.

In addition, no positive electrode current collector is included when the electrode is applied to a lithium air battery. Consequently, it is possible to reduce the weight of the battery and to increase the lifespan of the battery through an increase in the energy density thereof.

The effects of the present disclosure are not limited to those mentioned above. It should be understood that the effects of the present disclosure include all effects that can be inferred from the foregoing description of the present disclosure.

The disclosure has been described in detail. However, it will be appreciated by those skilled in the art that changes may be made without departing from the principles and spirit of the disclosure.

What is claimed is:

1. A method of manufacturing a positive electrode for lithium air batteries, the method comprising:
    ball-milling a mixture of 70 to 99 wt % of a positive electrode active material and 1 to 30 wt % of a binder to manufacture an electrode mixture; and
    applying the electrode mixture to release paper and rolling the electrode mixture to manufacture the positive electrode,
    wherein a mixing ratio of the electrode mixture to a ball put into a reaction vessel is 1:150 to 1:350 in a weight ratio.

2. The method according to claim 1, wherein, at the step of manufacturing the electrode mixture, ball-milling is performed using a planetary mill.

3. The method according to claim 1, wherein, at the step of manufacturing the electrode mixture, ball-milling is performed in a state in which the electrode mixture and the ball are put in the reaction vessel.

4. The method according to claim 1, wherein the ball comprises a first ball and a second ball, and a diametric ratio of the first ball to the second ball is 1 to 5:1.

5. The method according to claim 4, wherein a weight ratio of the first ball to the second ball is 1:1 to 3.5.

6. The method according to claim 1, wherein the ball is made of one selected from among zirconia, tool steel, stainless steel, and cemented carbide.

7. The method according to claim 1, wherein the step of manufacturing the electrode mixture is performed for 5 to 8 cycles under conditions of a rotation speed of 50 to 200 rpm and a time of 5 to 15 minutes.

8. The method according to claim 1, wherein the positive electrode active material is at least one selected from a group consisting of carbon black, carbon nanotubes (CNT), graphene, and reduced graphene oxide (rGO).

9. The method according to claim 1, wherein the binder is polytetrafluoroethylene (PTFE).

10. The method according to claim 1, wherein a density of the positive electrode is 100 to 500 mg/cc.

11. The method according to claim 1, wherein the positive electrode has a porous structure having a pore size of 10 nm to 100 μm.

12. The method according to claim 1, wherein the positive electrode has a thickness of 10 to 200 μm.

13. The method according to claim 1, further comprising heat-treating the rolled and manufactured positive electrode after the step of manufacturing the positive electrode.

14. The method according to claim 13, wherein, at the step of heat-treating the positive electrode, heat-treating is performed at a temperature of 150 to 300° C. for 10 minutes to 2 hours.

* * * * *